US011418327B2

(12) United States Patent
Seaborn et al.

(10) Patent No.: US 11,418,327 B2
(45) Date of Patent: Aug. 16, 2022

(54) AUTOMATIC PROVISIONING OF KEY MATERIAL ROTATION INFORMATION TO SERVICES

(71) Applicant: International Business Machines Corporation, Armonk, NY (US)

(72) Inventors: Mark Duane Seaborn, Algonquin, IL (US); Karunakar Bojjireddy, Apex, NC (US); Erlander Lo, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 16/683,391

(22) Filed: Nov. 14, 2019

(65) Prior Publication Data
US 2021/0152336 A1 May 20, 2021

(51) Int. Cl.
*H04L 9/08* (2006.01)
*H04L 9/06* (2006.01)

(52) U.S. Cl.
CPC ............ *H04L 9/083* (2013.01); *H04L 9/0631* (2013.01); *H04L 9/088* (2013.01); *H04L 9/0822* (2013.01); *H04L 9/0891* (2013.01)

(58) Field of Classification Search
CPC ..... H04L 9/083; H04L 9/0631; H04L 9/0822; H04L 9/088; H04L 9/0891
See application file for complete search history.

(56) References Cited

U.S. PATENT DOCUMENTS

| 7,818,586 B2 * | 10/2010 | Witt ...................... G06F 21/602 713/193 |
| 8,539,231 B1 | 9/2013 | Durgin et al. |
| 8,964,990 B1 | 2/2015 | Baer et al. |
| 9,172,532 B1 * | 10/2015 | Fuller .................... H04L 9/0894 |
| 9,953,317 B2 | 4/2018 | Abou-Nasr et al. |
| 10,140,185 B1 * | 11/2018 | Lopez ................... G06F 16/128 |

(Continued)

FOREIGN PATENT DOCUMENTS

WO 2018080950 A1 5/2018

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Theodore C Parsons
*Assistant Examiner* — Howard H. Louie
(74) *Attorney, Agent, or Firm* — James L. Olsen (57) ABSTRACT

A key management service creates a key upon user request. The key management service receives a request for a first cryptographic operation. The key management service performs the first cryptographic operation. The key management service returns results of the first cryptographic operation to a dependent service. The key management service receives a notification of key rotation. The key management service receives a request for a second cryptographic operation. The key management service performs the second cryptographic operation. The key management service returns results of the second cryptographic operation to the dependent service. The key management service returns updated key metadata to the dependent service.

17 Claims, 5 Drawing Sheets

(56) References Cited

U.S. PATENT DOCUMENTS

| | | | |
|---|---|---|---|
| 10,546,141 B2* | 1/2020 | Miguel | G06F 21/602 |
| 2003/0219129 A1 | 11/2003 | Whelan et al. | |
| 2005/0226420 A1 | 10/2005 | Makela et al. | |
| 2010/0316219 A1 | 12/2010 | Boubion et al. | |
| 2016/0105283 A1 | 4/2016 | Mityagin | |

OTHER PUBLICATIONS

Patel et al., "Secure Data Transfer Architecture for Benchmarking," U.S. Appl. No. 16/208,971, filed Dec. 4, 2018.
Tav et al., "Access Revocation Messaging Mechanism," U.S. Appl. No. 16/519,900, filed Jul. 23, 2019.

* cited by examiner

AUTOMATIC PROVISIONING OF KEY MATERIAL ROTATION INFORMATION TO SERVICES

BACKGROUND

The present disclosure relates to encryption, and more specifically, to informing services of encryption key rotation.

In interacting with cloud services, a user, such as an administrator, can create multiple types of keys. These keys can include key encryption keys (KEKs) (e.g., "root key," "customer root key") and a "data encryption key" or DEK. A DEK can be a symmetric key that is used for cryptography and can be used to directly encrypt and decrypt data. A KEK can be a symmetric key-wrapping key that can be used to protect other cryptographic keys (including a DEK) with advanced encryption. The KEK can also be used to unwrap or decrypt an encrypted DEK. Encrypting an encryption key can combine the strength of multiple algorithms to protect the privacy and the integrity of data which is ultimately encrypted with the encrypted key. KEKs can be "rotated," which refers to retiring a KEK's original key material and replacing the key material with new cryptographic key material.

SUMMARY

Disclosed herein are embodiments of a method, system, and computer program product for automatic provisioning of key material rotation information to services. A key management service creates a key upon user request. The key management service receives a request for a first cryptographic operation. The key management service performs the first cryptographic operation. The key management service returns results of the first cryptographic operation to a dependent service. The key management service receives a notification of key rotation. The key management service receives a request for a second cryptographic operation. The key management service performs the second cryptographic operation. The key management service returns results of the second cryptographic operation to the dependent service. The key management service returns updated key metadata to the dependent service.

Additionally disclosed is a system for automatic provisioning of key material rotation information to services. The system comprises one or more processors, and a memory communicatively coupled to the one or more processors, wherein the memory comprises instructions which, when executed by the one or more processors, cause the one or more processors to perform a method. A key management service receives a request for a cryptographic operation. Based on the request, it is determined that a key involved in the request has been rotated. The key management service performs the cryptographic operation. The key management service returns results of the cryptographic operation to a dependent service. In response to the determining the key has been rotated, updated key metadata is generated. The key management service returns the updated key metadata to the dependent service.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to encryption, and more particular aspects relate to informing cloud services of encryption key rotation. While the present disclosure is not necessarily limited to such applications, various aspects of the disclosure may be appreciated through a discussion of various examples using this context.

In interacting with cloud services, a user, such as an administrator, can create multiple types of keys. These keys can include key encryption keys (KEKs) (e.g., "root key," "customer root key") and a standard key (e.g., "data encryption key" or DEK). A DEK can be a symmetric key that is used for cryptography and can be used to directly encrypt and decrypt data. A KEK can be a symmetric key-wrapping key that can be used to protect other cryptographic keys (including a DEK) with advanced encryption. The KEK can also be used to unwrap or decrypt an encrypted DEK. Encrypting an encryption key can combine the strength of multiple algorithms to protect the privacy and the integrity of data which is ultimately encrypted with the encrypted key.

KEKs can be "rotated," which refers to retiring a KEK's original key material and replacing the key material with new cryptographic key material. Rotating keys on a regular basis, including on an automatic basis based on a time interval, helps meet industry standards and cryptographic best practices. This reduces the ability of nefarious actors to breach security and/or limits the duration of any security breach. In addition to or instead of rotating keys on an automatic basis based on a time interval, keys can be rotated manually, on-demand. Rotating a key upon detection of a security breach can remediate a security breach. In some environments, key material can be provided by a customer, including updated key material for a key rotation.

When a KEK is rotated, its metadata, such as its name, key ID, date of creation, or other metadata, does not change. Retired key material is retained for use in decrypting DEKs which have been encrypted using the older version of the KEK but becomes archived, preventing it from being used for encrypting DEKs as the newly generated cryptographic key material is used after rotation. In the time period after a KEK is rotated, one or more DEKs which have previously been encrypted using retired key material of the KEK can exist. Until these DEKs are re-wrapped or re-encrypted using the latest key material of the KEK, they rely on the older encryption of the retired key material.

In some distributed or cloud systems, there may be no business logic bus or message hub that allows services to communicate events to other services in real time. In such systems, a service may not learn of or be notified that key rotation has occurred, and that old key material has been replaced with new key material. As disclosed herein, collaborative services can embed state change information into existing protocols to inform services dependent on encryption key material that keys have changed. This can be used instead of creating a system bus, which could be a logical bus implemented using network sockets, for communicating between services.

As disclosed herein, an end user can create a KEK using a key management service. The end user can send a first service request with the key ID of the KEK to a dependent service, which then requests that a cryptographic operation be performed by the key management service. The key management service returns the results of the operation and metadata about the key used to the dependent service. The dependent service can store this metadata for future operations. The results can also be provided to the end user. After this first service request is handled, the user can rotate the KEK with the key management service, while maintaining the same key ID. When a second service request is sent to the dependent service, it can request another cryptographic operation be performed by the key management service. This can use the user provided key ID and the metadata stored from the previous service request; however, since the KEK has been rotated, this metadata is stale. The key management service can return the results of the operation and include with these results rotation metadata that can be used to update the stored metadata in the dependent service. Through these operations, a KEK can be used successfully after creation and again after rotation, and the dependent service can be updated with the rotation information without using external channels.

A system and process for automatic provisioning of key material rotation information to services as described herein can provide advantages over alternative methods. As disclosed herein, these collaborative services used can be loosely coupled cloud services, and by using existing communication protocols, new application programming interface (API) calls or other means of communication can be avoided. By using an existing protocol for communication within the cloud, the need for queries regarding key rotation can be eliminated and/or pushing information to all interested parties/services can be eliminated. This can also defer handling key rotation information until needed and thus can be addressed during idle periods. Updating of metadata for rotation can be scheduled for when opportunities arise when it is needed. This can also provide for in-context awareness of a rotation's impact on data resources, meaning that a service knows which DEK is "stale," or has been encrypted using a retired version of a KEK. This can also enable rotation of keys where adopting services/clients do not need to maintain the versions of each key. These improvements and/or advantages are a non-exhaustive list of example advantages. Embodiments of the present disclosure exist which can contain none, some, or all of the aforementioned advantages and/or improvements.

Figure 1:
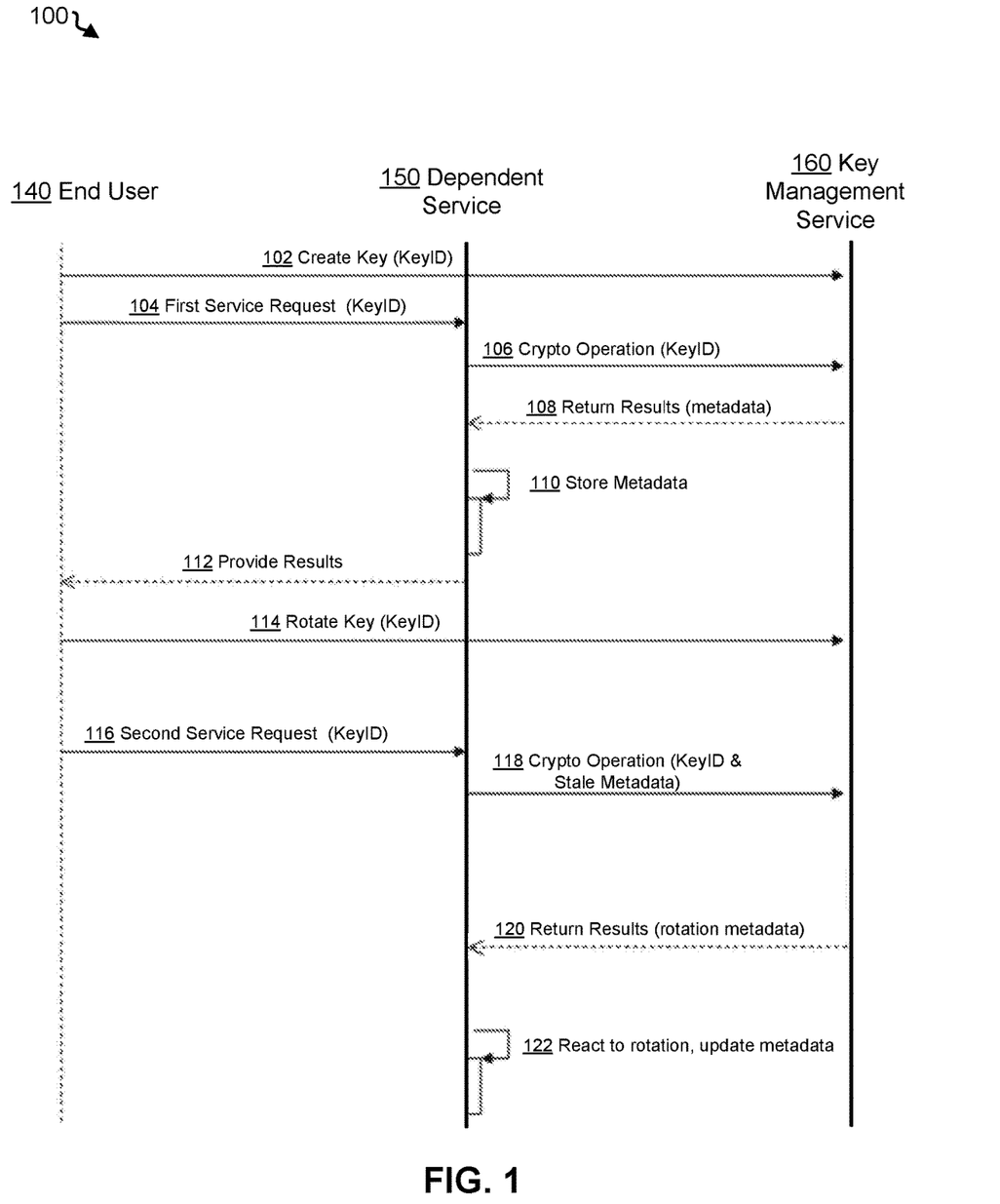
FIG. 1 depicts an example flow diagram of communication between an end user, dependent service, and key management service involving automatic provisioning of key material rotation information to services, in accordance with embodiments of the present disclosure.
Figure 4:
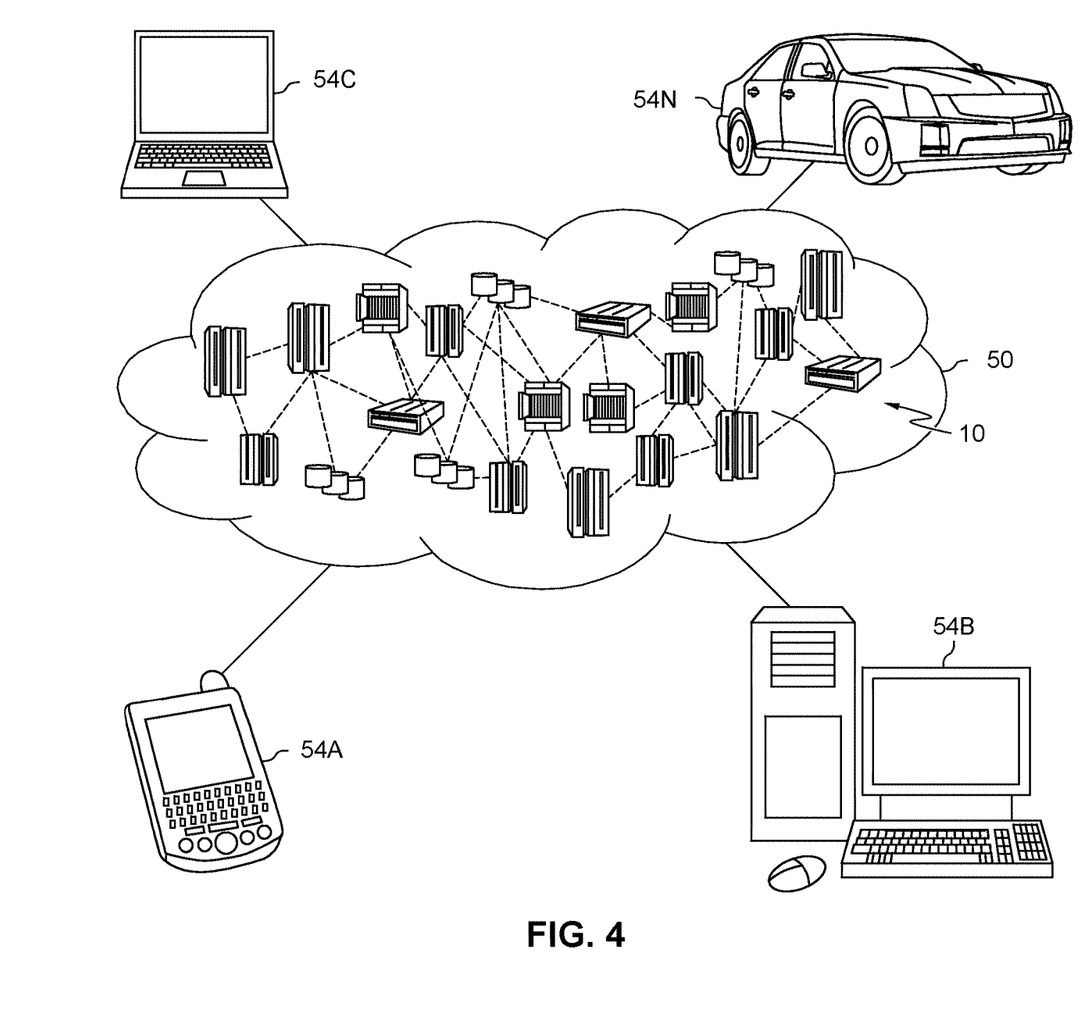
FIG. 4 depicts a cloud computing environment, according to some embodiments of the present disclosure.
Figure 5:
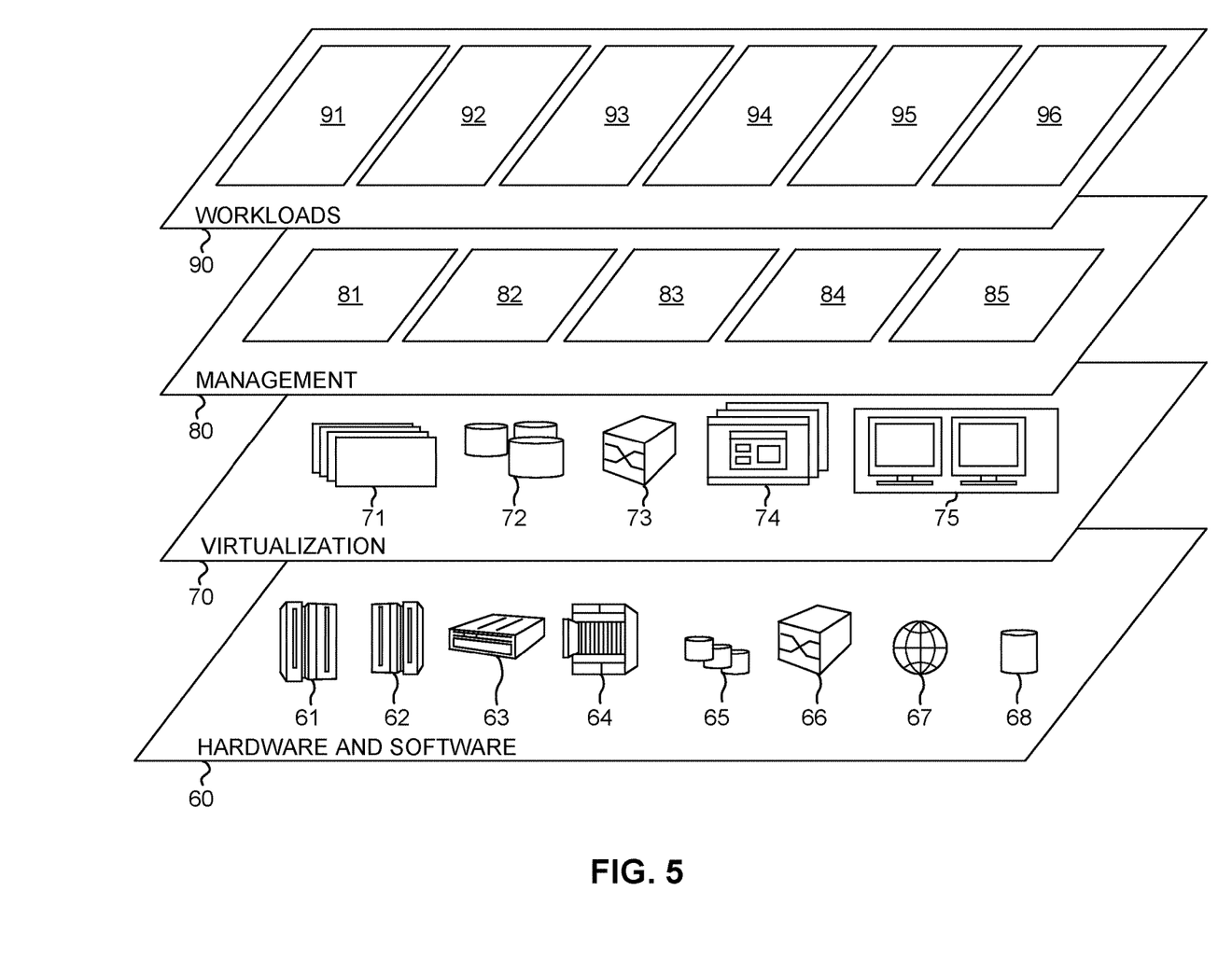
FIG. 5 depicts abstraction model layers, according to some embodiments of the present disclosure.

FIG. 1 depicts an example flow diagram 100 of communication between an end user 140, dependent service 150, and key management service 160 involving automatic provisioning of key material rotation information to services, in accordance with embodiments of the present disclosure. Flow Diagram 100 can include more or fewer operations than those depicted. Flow Diagram 100 can include operations in different orders than those depicted. One or more of the end user 140, dependent service 150, and key management service 160 can involve actions implemented by a computer system (such as computer system 300 depicted in FIG. 3), a collection of computers, one or more virtual machines (including running on a cloud platform), a component of a computer, or firmware or other software running on a computer. Flow Diagram 100 can involve use of a cloud computing environment, such as depicted in FIGS. 4 and 5.

At operation 102, the end user 140 creates a KEK using the key management service 160, and the KEK is given a key ID (an identifier) which can be used to refer to the created KEK. In some embodiments, this KEK can be used for encrypting one or more DEKs. This KEK created at 140 can be the KEK of the end user 140, an organization associated with the end user, or an administrator associated with the end user. The KEK can be a randomly generated key, such as one generated using Advanced Encryption Standard 256.

At operation 104, the end user 140 sends a first service request to the dependent service 150, with an accompanying key ID to use. This request can request that an operation be performed by the dependent service 150. The dependent service 150 can vary in embodiments and take many forms of services. One example service could be a cloud object storage service, and the request from the end user 140 could be a request to store information in the cloud object storage or access previously stored information. The dependent service 150 can be a service which uses keys, such as DEKs, from a key management service 160.

At operation 106, the dependent service 150 requests that a cryptographic ("crypto") operation be performed by the key management service 160. The nature of the cryptographic operation can vary in embodiments and can include key generation, key derivation, key import/export, random number generation, encrypt/decrypt, hash, sign, and verify, generating or verifying a message authentication code, ping generation or verification, secure messaging, or other cryptographic operations as appropriate for the service request. The cryptographic operation can be performed using the KEK associated with the key ID (i.e., the key created at operation 102).

At operation 108, the key management service 160 returns the results of the cryptographic operation to the dependent service 150, along with metadata. The metadata can be data the dependent service 150 must store to execute future operations. The nature of the metadata can vary in embodiments. In some embodiments, the metadata can be data about data, which in this case can be a name, key ID, date of creation, or other data about the key used, including background information that the key management service 160 can use to track versions of KEKs. The metadata can additionally be a wrapped DEK that has been wrapped by the KEK for the dependent service 150 to use in future operations.

At operation 110, the dependent service 150 stores or caches the metadata received from the key management service 160. This metadata, including the wrapped DEK, can be stored for future use, such as in operation 118 described below. This can be used to track a version of the KEK used to wrap a DEK, which can be important as the dependent service 150 will be unaware of future key rotations until it is discovered that the metadata is no longer current.

At operation 112, the dependent service 150 provides the results of the first service request to the end user 140. Continuing with the example from above, this could be a response to the request to store information in the cloud object storage (such as that storage was successful) or a response to the request to access previously stored information (such as providing said information).

At operation 114, the end user 140 performs a key rotation using the key management service 160. This can occur on a scheduled basis or upon demand from the end user 140. The key management service 160 can rotate a KEK, such as the KEK created at operation 102.

At operation 116, the end user 140 can request a second service be performed by the dependent service 150, including the same key ID as before. This operation can be similar to that performed in operation 104. The nature of the second request can be different from that of the first request (e.g., a request to access instead of a request to store). An example request could be where the end user 140 asks the dependent service 150 to ask the key management service 160 to decrypt a message with the key.

At operation 118, the dependent service 150 requests a cryptographic operation be performed by the key management service 160. The nature of the cryptographic operation can vary in embodiments. The request from the dependent service 150 can be accompanied by the key ID and the metadata stored at operation 110, including the wrapped DEK, which is now stale due to the key rotation at operation 114.

At operation 120, the key management service 160 can successfully return results of the cryptographic operation to the dependent service 150, despite the inclusion of the stale metadata. This is because the KEK can still be identified by the key ID after the key rotation, and the key management service 160 can use archived data regarding the old key material of the KEK to access one or more DEKs encrypted using the previous key material (including that contained within the stale metadata). The key management service 160 recognizes the version of the key is older than the current version, and as such, in addition to the results, the key management service 160 can provide information regarding the rotation to the dependent service 150. The rotation information can be the updated wrapped DEK. In addition to or instead of wrapping the DEK with the rotated KEK, in some embodiments, the key management service 160 can perform additional operations or respond to additional events relating to the KEK or DEK as appropriate.

At operation 122, the dependent service 150 reacts to the information regarding the rotation, which includes updating the stored metadata. This can include updating any caches or local copies of metadata and/or encrypted data using the key. When the dependent service 150 recognizes a rotation body or header in any response from a key management or cryptographic operation, it can use the rotation information included in the response to update its local information about the key to meet end user key rotation policies.

Figure 2:
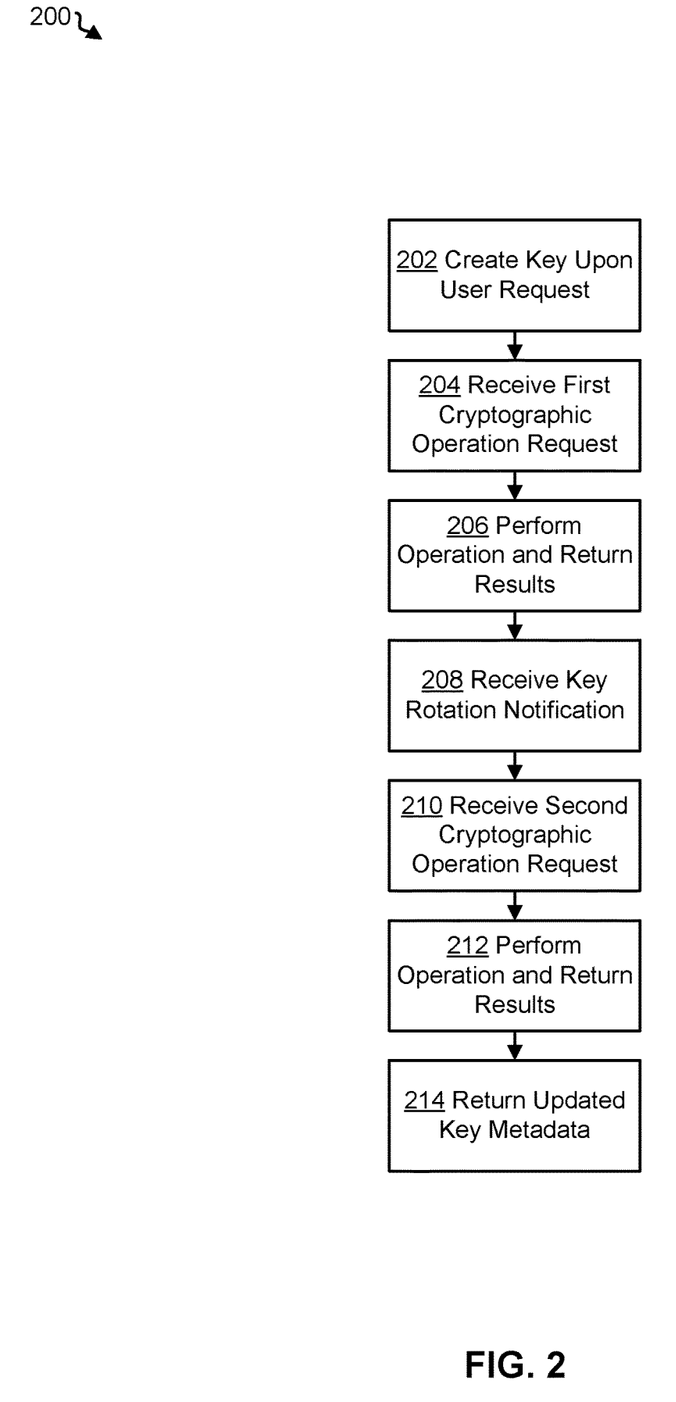
FIG. 2 depicts an example method for automatic provisioning of key material rotation information to services, in accordance with embodiments of the present disclosure.

FIG. 2 depicts an example method 200 for automatic provisioning of key material rotation information to services, in accordance with embodiments of the present disclosure. Method 200 can include more or fewer operations than those depicted. Method 200 can include operations in different orders than those depicted. The following discussion will refer to method 200 being performed by a key management service (such as key management service 160 of FIG. 1). The key management service can be implemented by a computer system (such as computer system 300 depicted in FIG. 3), a collection of computers, one or more virtual machines (including running on a cloud platform), a component of a computer, or firmware or other software running on a computer. Method 200 can involve use of a cloud computing environment, such as depicted in FIGS. 4 and 5.

At operation 202, the key management service creates a KEK upon user request. The KEK is given a key ID (an identifier) which can be used to refer to the created KEK. In some embodiments, this KEK can be used for encrypting one or more DEKs. This KEK can be the KEK of the end user, an organization associated with the end user, or an administrator associated with the end user. In some embodiments, a user may be able to provide a key to the key management service and in such embodiments, creating the key can be adapting the key to the key management service, such as by appending any necessary metadata.

At operation 204, the key management service receives a request for a cryptographic operation to be performed. This can be relayed by a dependent service and may originate at the request of an end user. The nature of the cryptographic operation can vary in embodiments and can include key generation, key derivation, key import/export, random number generation, encrypt/decrypt, hash, sign, and verify, generating or verifying a message authentication code, ping generation or verification, secure messaging, or other cryptographic operations as appropriate for the service request. The cryptographic operation can be performed using the KEK associated with the key ID (i.e., the KEK created at operation 202).

At operation 206, the key management service performs the operation and returns the results of the cryptographic operation to the dependent service, along with metadata. The metadata can be data the dependent service must store to execute future operations. The nature of the metadata can vary in embodiments. In some embodiments, the metadata can be data about data, which in this case can be a name, key ID, date of creation, or other data about the key used including background information that the key management service can use to track versions of KEKs. The metadata can additionally be a wrapped DEK that has been wrapped by the KEK for the dependent service to use in future operations.

At operation 208, the key management service receives a key rotation notification, which can be the result of an end user requesting or initiating a key rotation request. This can occur on a scheduled basis or upon demand from the user. The key management service can rotate the KEK, such as the KEK created at operation 202.

At operation 210, the key management service receives a second request for a cryptographic operation to be performed. This can be relayed by a dependent service and may originate at the request of an end user and can be similar to that received at operation 204. The request from the dependent service can be accompanied by the key ID and the metadata previously sent to the dependent service at operation 206, including the wrapped DEK, which is now stale due to the key rotation at operation 208.

At operation 212, the key management service performs the operation and successfully returns results of the cryptographic operation to the dependent service, despite the inclusion of the stale metadata. This is because the KEK can still be identified by the key ID after the key rotation, and the key management service can use archived data regarding the old key material of the KEK to access one or more DEKs encrypted using the previous key material (including that contained within the stale metadata).

At operation 214, the key management service can return updated key metadata to the dependent service. The key management service recognizes that the version of the key is older than the current version, and as such, in addition to the results, the key management service can provide information regarding the rotation to the dependent service. The rotation information can be the updated wrapped DEK. In addition to or instead of wrapping the DEK with the rotated KEK, in some embodiments, the key management service can perform additional operations or respond to additional events relating to the KEK or DEK as appropriate. In some embodiments, the key management service can track which DEKs are wrapped using previous, archived versions of the KEK. In some embodiments, once there are no longer any DEKs wrapped using an archived version of the KEK, the archived version can be deleted.

Figure 3:
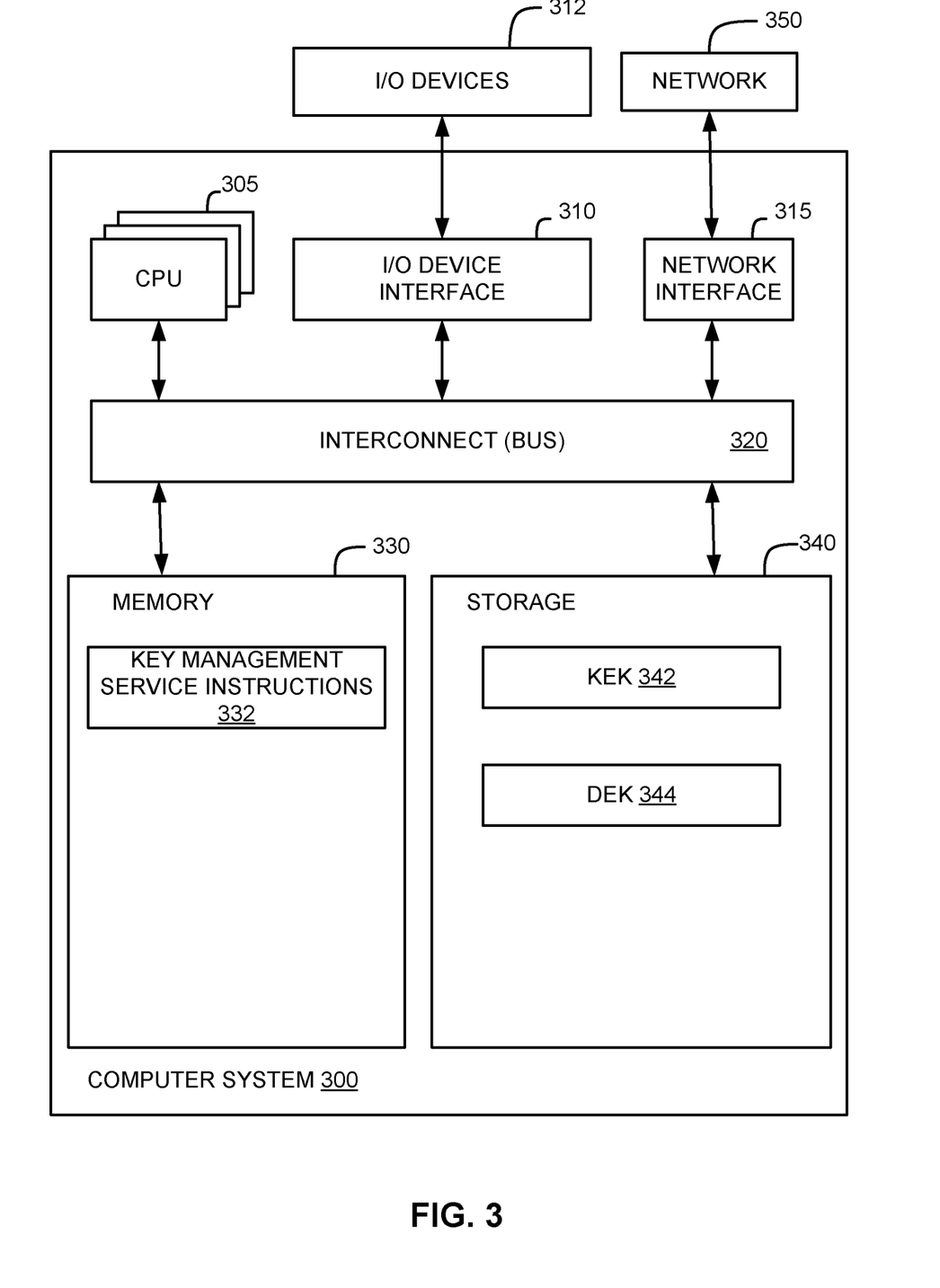
FIG. 3 illustrates a block diagram of a computer system, in accordance with some embodiments of the present disclosure.

Referring now to FIG. 3, illustrated is a block diagram of a computer system 300, in accordance with some embodiments of the present disclosure. In some embodiments, computer system 300 performs operations in accordance with FIGS. 1 and 2 as described above. The computer system 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340.

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash).

In some embodiments, the memory 330 can be in the form of modules (e.g., dual in-line memory modules). The storage 340 is generally included to be representative of a non-volatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the computer system 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of computer system 300 includes key management service instructions 332. Key management service instructions 332 can be an application or compilation of computer instructions for automatic provisioning of key material rotation information to services. Key management service instructions 332 can be computer instructions for performing method 200 as described above with regard to FIG. 2.

Storage 340 contains KEK 342 and DEK 344. KEK 342 can be a symmetric key-wrapping key that can be used to protect other cryptographic keys (including a DEK) with advanced encryption. The KEK can also be used to unwrap or decrypt an encrypted DEK. DEK 344 can be a symmetric key that is used for cryptography and can be used to directly encrypt and decrypt data.

In some embodiments as discussed above, the memory 330 stores key management service instructions 332, and the storage 340 stores KEK 342 and DEK 344. However, in various embodiments, each of the key management service instructions 332, KEK 342, and DEK 344 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with computer system 300. In some embodiments, I/O devices 312 can include a display and/or an audio speaker for presenting information to a user of computer system 300.

The network 350 can connect (via a physical or wireless connection) the computer system 300 with other networks, and/or one or more devices that interact with the computer system.

Logic modules throughout the computer system 300—including but not limited to the memory 330, the CPUs 305, and the I/O device interface 310—can communicate failures and changes to one or more components to a hypervisor or operating system (not depicted). The hypervisor or the operating system can allocate the various resources available in the computer system 300 and track the location of data in memory 330 and of processes assigned to various CPUs 305. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 40 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic provisioning of key material rotation information to services 96. Automatic provisioning of key material rotation information to services 96 can be a workload or function such as that described in FIGS. 1 and/or 2 above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A method for automatic provisioning of key material rotation information to services, the method comprising:
   creating, by a key management service, a key upon user request;
   receiving, by the key management service and from a cloud object storage service, a request for a first cryptographic operation;
   performing, by the key management service, the first cryptographic operation using the key;
   returning, by the key management service, results of the first cryptographic operation to the cloud object storage service;
   receiving, by the key management service, a notification of key rotation;
   after receiving the notification of key rotation, receiving, by the key management service and from the cloud object storage service, a request for a second cryptographic operation;
   performing, by the key management service, the second cryptographic operation using the key by referencing archived metadata directed to the key;
   returning, by the key management service, results of the second cryptographic operation to the cloud object storage service including an indication that the key includes old key material as a result of the key rotation; and
   returning, by the key management service, updated key metadata including new key material generated during the key rotation directed to an updated version of the key to be used for future cryptographic operations to the cloud object storage service.

2. The method of claim 1, wherein the key is a key encryption key.

3. The method of claim 2, wherein returning the updated key metadata includes returning a wrapped data encryption key wrapped using the key encryption key.

4. The method of claim 1, wherein the key is a key encryption key generated using Advanced Encryption Standard 256.

5. The method of claim 1, wherein the updated key metadata includes a key name, a key ID, and a date of key creation.

6. The method of claim 1, further comprising:
   updating, by the cloud object storage service, one or more local copies of metadata for the key with the updated key metadata.

7. A system for automatic provisioning of key material rotation information to services, the system comprising:
   one or more processors; and
   a memory communicatively coupled to the one or more processors,
   wherein the memory comprises instructions which, when executed by the one or more processors, cause the one or more processors to perform a method comprising:
   receiving, by a key management service and from a cloud object storage service, a request for a cryptographic operation;
   determining, based on the request, that a key involved in the request has been rotated;
   after determining that the key involved in the request has been rotated, performing, by the key management service, the cryptographic operation using the key by referencing archived metadata directed to the key;
   returning, by the key management service, results of the cryptographic operation including an indication that the key includes old key material as a result of the key rotation to the cloud object storage service;
   generating, in response to the determining the key has been rotated, updated key metadata including new key material directed to the key; and
   returning, by the key management service, the updated key metadata including the new key material generated during the key rotation directed to an updated version of the key to be used for future cryptographic operations to the cloud object storage service.

8. The system of claim 7, wherein the key is a key encryption key.

9. The system of claim 8, wherein returning the updated key metadata includes returning a wrapped data encryption key wrapped using the key encryption key.

10. The system of claim 7, wherein the key is a key encryption key generated using Advanced Encryption Standard 256.

11. The system of claim 7, wherein the updated key metadata includes a key name, a key ID, and a date of key creation.

12. The system of claim 7, further comprising:
updating, by the cloud object storage service, one or more local copies of metadata for the key with the updated key metadata.

13. A computer program product for automatic provisioning of key material rotation information to services, the computer program product comprising a computer readable storage medium having program instructions embodied therewith, the program instructions executable by a computer to perform a method comprising:
creating, by a key management service, a key upon user request;
receiving, by the key management service and from a cloud object storage service, a request for a first cryptographic operation;
performing, by the key management service, the first cryptographic operation using the key;
returning, by the key management service, results of the first cryptographic operation to the cloud object storage service;
receiving, by the key management service, a notification of key rotation;
after receiving the notification of key rotation, receiving, by the key management service and from the cloud object storage service, a request for a second cryptographic operation;
performing, by the key management service, the second cryptographic operation using the key by referencing archived metadata directed to the key;
returning, by the key management service, results of the second cryptographic operation to the cloud object storage service including an indication that the key includes old key material as a result of the key rotation; and
returning, by the key management service, updated key metadata including new key material generated during the key rotation directed to an updated version of the key to be used for future cryptographic operations to the cloud object storage service.

14. The computer program product of claim 13, wherein the key is a key encryption key.

15. The computer program product of claim 14, wherein returning the updated key metadata includes returning a wrapped data encryption key wrapped using the key encryption key.

16. The computer program product of claim 13, wherein the key is a key encryption key generated using Advanced Encryption Standard 256.

17. The computer program product of claim 13, wherein the updated key metadata includes a key name, a key ID, and a date of key creation.

* * * * *